United States Patent
Shen

(10) Patent No.: US 9,819,249 B2
(45) Date of Patent: Nov. 14, 2017

(54) MOTOR STATOR LOCATING METHOD

(71) Applicant: ASIA VITAL COMPONENTS (CHENGDU) CO., LTD., Chengdu, Sichuan Province (CN)

(72) Inventor: Meng Shen, Chengdu (CN)

(73) Assignee: Asia Vital Components (Chengdu) Co., Ltd., Chengdu, Sichuan Province (CN)

( * ) Notice: Subject to any disclaimer, the term of this patent is extended or adjusted under 35 U.S.C. 154(b) by 232 days.

(21) Appl. No.: 14/636,202

(22) Filed: Mar. 3, 2015

(65) Prior Publication Data

US 2016/0261176 A1    Sep. 8, 2016

(51) Int. Cl.
*H02K 15/00* (2006.01)
*H02K 15/02* (2006.01)
*H02K 15/14* (2006.01)
*H02K 11/33* (2016.01)
*H02K 1/18* (2006.01)

(52) U.S. Cl.
CPC ............. *H02K 15/02* (2013.01); *H02K 11/33* (2016.01); *H02K 15/14* (2013.01); *H02K 1/182* (2013.01); *Y10T 29/49009* (2015.01)

(58) Field of Classification Search
CPC ........... H05K 13/0408; H05K 13/0404; H05K 13/04; Y10T 29/49009; Y10T 29/49826; Y10T 29/53; G01N 1/24

USPC .................. 29/596, 428, 598, 832, 833, 834
See application file for complete search history.

(56) References Cited

U.S. PATENT DOCUMENTS 7,045,921 B2 *   5/2006  Takagi ..................... H02K 5/00
                                                          310/89

FOREIGN PATENT DOCUMENTS

CN           102341645 A       2/2012

* cited by examiner

*Primary Examiner* — Thiem Phan
(74) *Attorney, Agent, or Firm* — C. G. Mersereau; Nikolai & Mersereau, P.A.

(57) ABSTRACT

A motor stator locating method for locating a motor stator structure on a circuit board is disclosed. The motor stator structure includes a base and a contact pad set. The base is provided at a central portion thereof with a raised portion, which is wound around by a coil having a plurality of turns. The contact pad set is correspondingly attached to one side of the base opposite to the raised portion, and has a first and a second contact pad. The coil has two ends respectively connected to the first and the second contact pad. With these arrangements, the motor stator structure can be manufactured at largely improved production efficiency and reduced error rate.

6 Claims, 6 Drawing Sheets

MOTOR STATOR LOCATING METHOD

FIELD OF THE INVENTION

The present invention relates to a motor stator locating method, and more specifically, to a motor stator locating method that enables a motor stator structure to be manufactured at largely improved production efficiency and reduced error rate.

BACKGROUND OF THE INVENTION

As the computation performance of electronic elements, such as central processing units (CPUs), has been largely upgraded, heat generated by the electronic elements is also increased. To ensure normal operation of the electronic elements, the heat generated by the electronic elements must be quickly and effectively removed. Therefore, on the heat-generating electronic elements, such as CPUs, heat dissipation devices are usually mounted to help in cooling the electronic elements.

Please refer to FIG. 1, which is a perspective view of a conventional motor stator structure. The conventional motor stator is mounted on a circuit board 10 and includes a plurality of coils 11 and a plurality of connection ends 111 outward extended from the coils 11. Conventionally, the connection ends 111 are manually welded to the circuit board 10. Since the connection ends 111 of the coils 11 are extremely small, errors often occur when the welding direction and position of the connection ends 111 are determined with naked eyes. Furthermore, since the connection ends 111 of the coils 11 are manually welded to the circuit board, the conventional motor stator structure is produced at relatively low efficiency.

In brief, the conventional motor stator structure has the following disadvantages: (1) the connections ends of the coils are manually welded to the circuit board at relatively low production efficiency; and (2) errors often occur in the production process because the welding position of the coil connection ends are determined with naked eyes.

It is therefore tried by the inventor to develop an improved motor stator structure to overcome the problems of the conventional motor stator structure.

SUMMARY OF THE INVENTION

To solve the above problems, a primary object of the present invention is to provide a motor stator locating method that enables a motor stator structure to be manufactured at largely improved production efficiency.

Another object of the present invention is to provide a motor stator locating method that enables a motor stator structure to be manufactured at largely reduced error rate.

To achieve the above and other objects, the motor stator structure provided according to the present invention includes a base and a contact pad set. The base is provided at a central portion thereof with a raised portion, which is wound around by a coil having a plurality of turns. The contact pad set is correspondingly attached to one side of the base opposite to the raised portion, and has a first and a second contact pad. The coil has two ends respectively connected to the first and the second contact pad.

To achieve the above and other objects, the motor stator locating method provided according to the present invention includes the following steps:

providing a motor stator structure and a circuit board;

providing a suction device to suck the motor stator structure thereto and then correspondingly locate the motor stator structure on the circuit board; and removing the suction device from the motor stator structure, so that the motor stator structure is located on the circuit board.

According to the motor stator structure and the motor stator locating method of the present invention, after the two ends of the coil are respectively connected to the first and the second contact pad, and the contact pad set is correspondingly attached to one side of the base opposite to the raised portion, a suction device is used to suck and move the motor stator structure onto a circuit board. Then, the suction device is removed and the motor stator structure is firmly mounted on the circuit board. Since the motor stator structure is located on the circuit board through standard operational procedures on mechanical equipment, the problem of low production efficiency due to conventional manual welding can be overcome to achieve largely increased production efficiency and reduced error rate.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
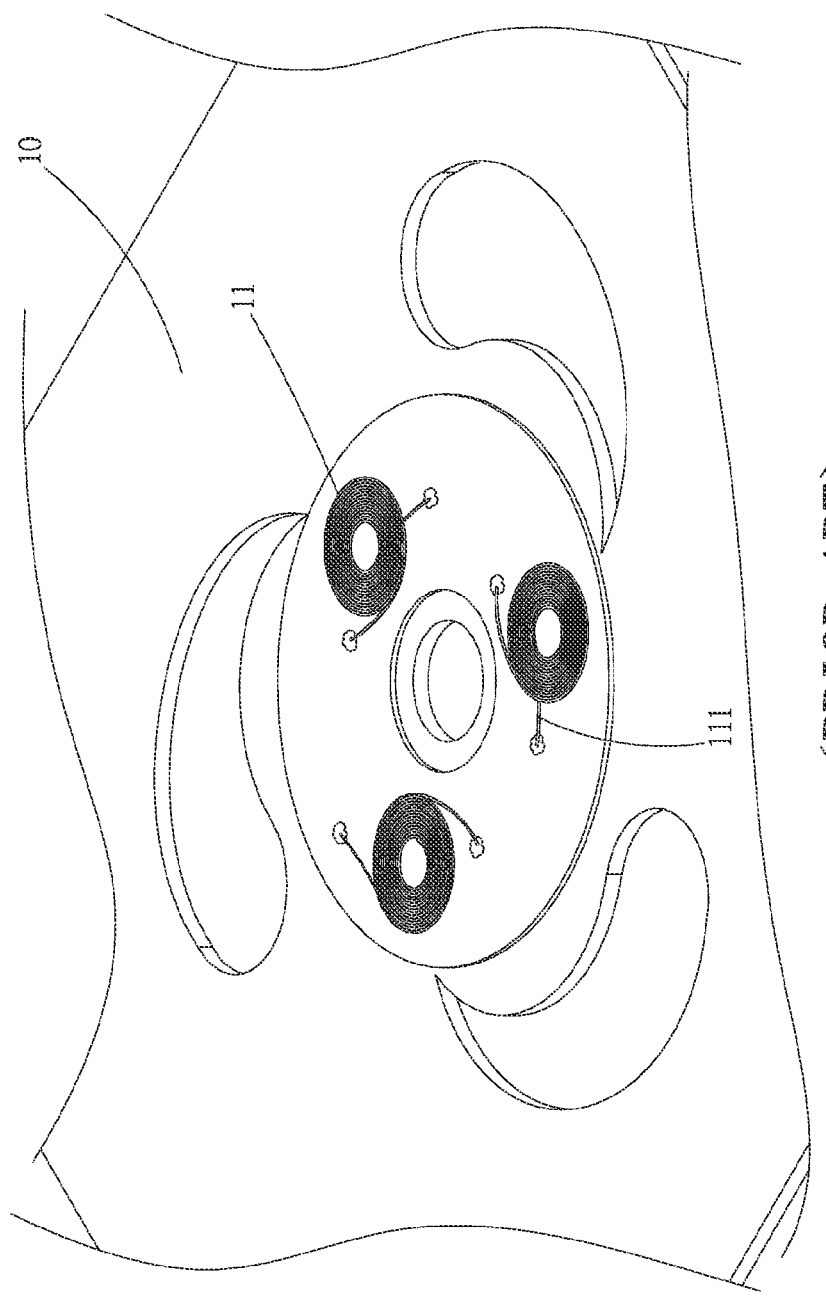
FIG. 1 is a perspective view of a conventional motor stator structure.

The present invention will now be described with some preferred embodiments thereof and by referring to the accompanying drawings. For the purpose of easy to understand, elements that are the same in the preferred embodiments are denoted by the same reference numerals.

Figure 2:
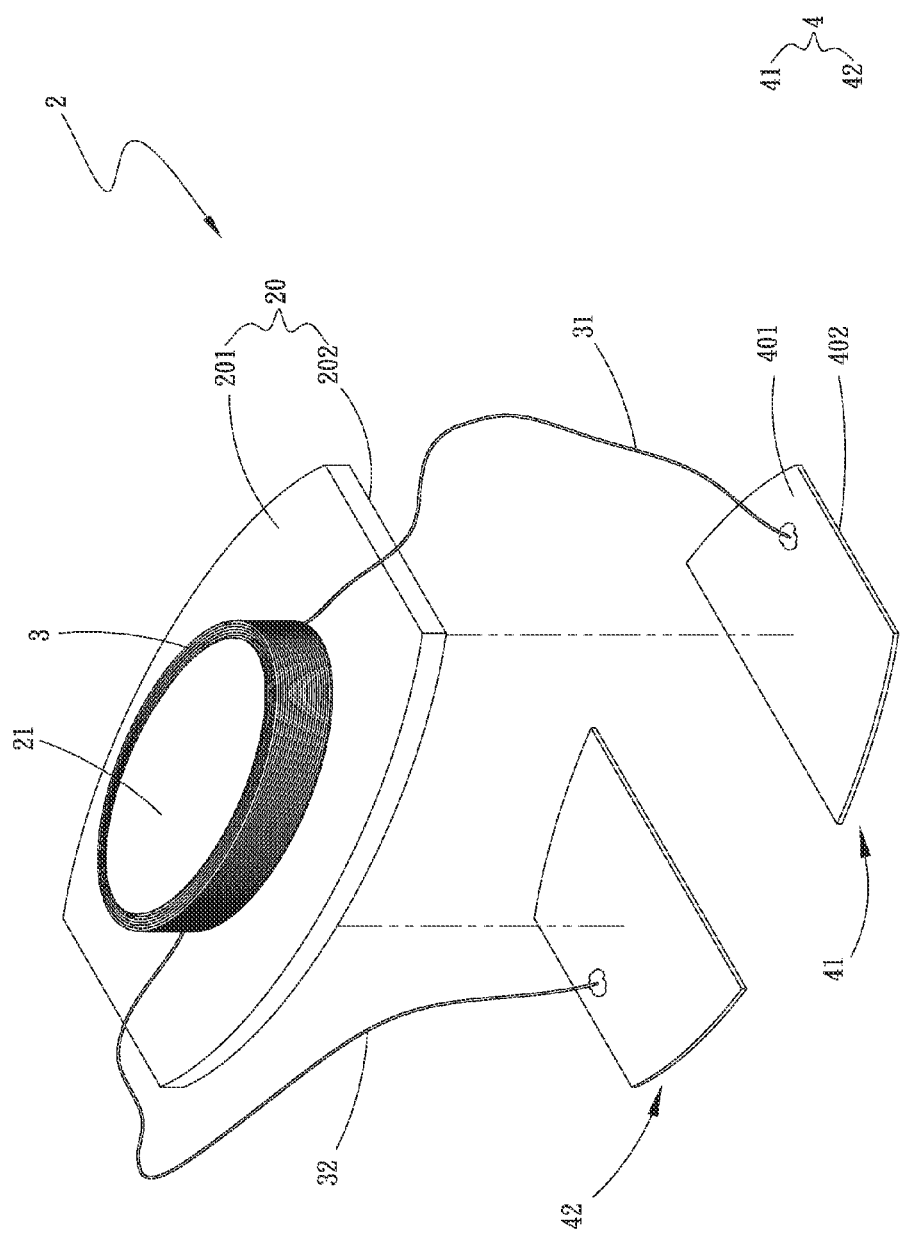
FIG. 2 is an exploded perspective view of a motor stator structure according to a preferred embodiment of the present invention.
Figure 3:
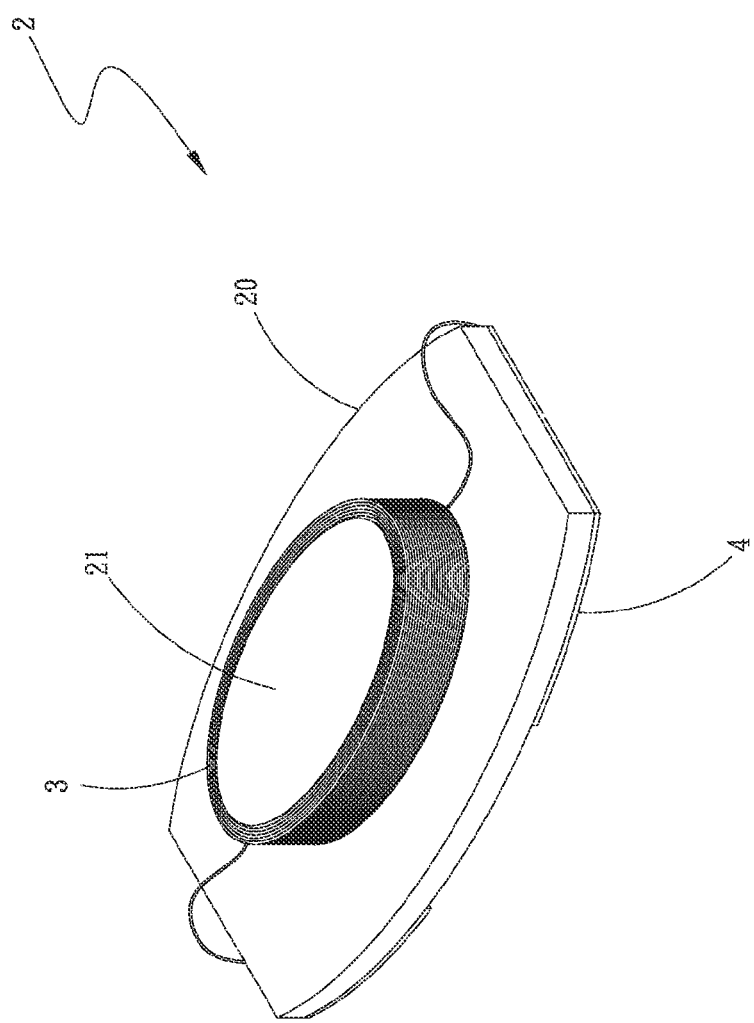
FIG. 3 is an assembled perspective view of FIG. 2.

Please refer to FIGS. 2 and 3, which are exploded and assembled perspective views, respectively, of a motor stator structure 2 according to a preferred embodiment of the present invention. As shown, the motor stator structure 2 includes a base 20 and a contact pad set 4. The base 20 is provided at a central portion thereof with a raised portion 21, and has a first and a second side 201, 202. The raised portion 21 is protruded from the first side 201 and wound around by a coil 3 having a plurality of turns, such that the coil 3 is located above the first side 201 of the base 20.

The contact pad set 4 is correspondingly attached to the second side 202 of the base 20, and includes a first and a second contact pad 41, 42, to which two ends of the coil 3 are connected. Further, the contact pad set 4 has an upper and a lower side 401, 402, and the two ends of the coil 3 are connected to the upper side 401 of the contact pad set 4.

The two ends of the coil 3 are defined as a first and a second end 31, 32, which are respectively connected to the first and the second contact pad 41, 42.

Figure 4:
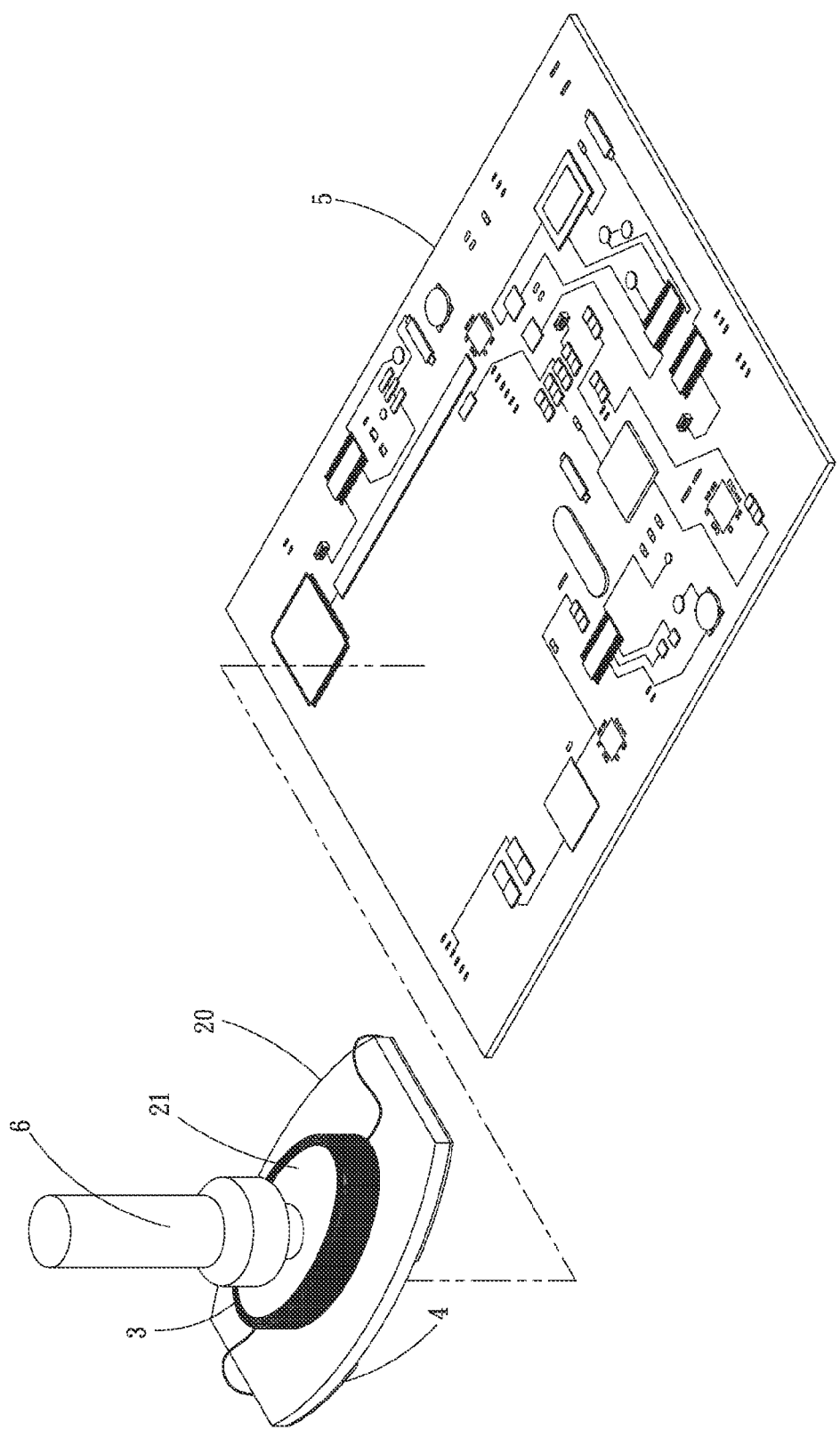
FIGS. 4 and 5 are pictorial description of a motor stator locating method according to a preferred embodiment of the present invention.
Figure 5:
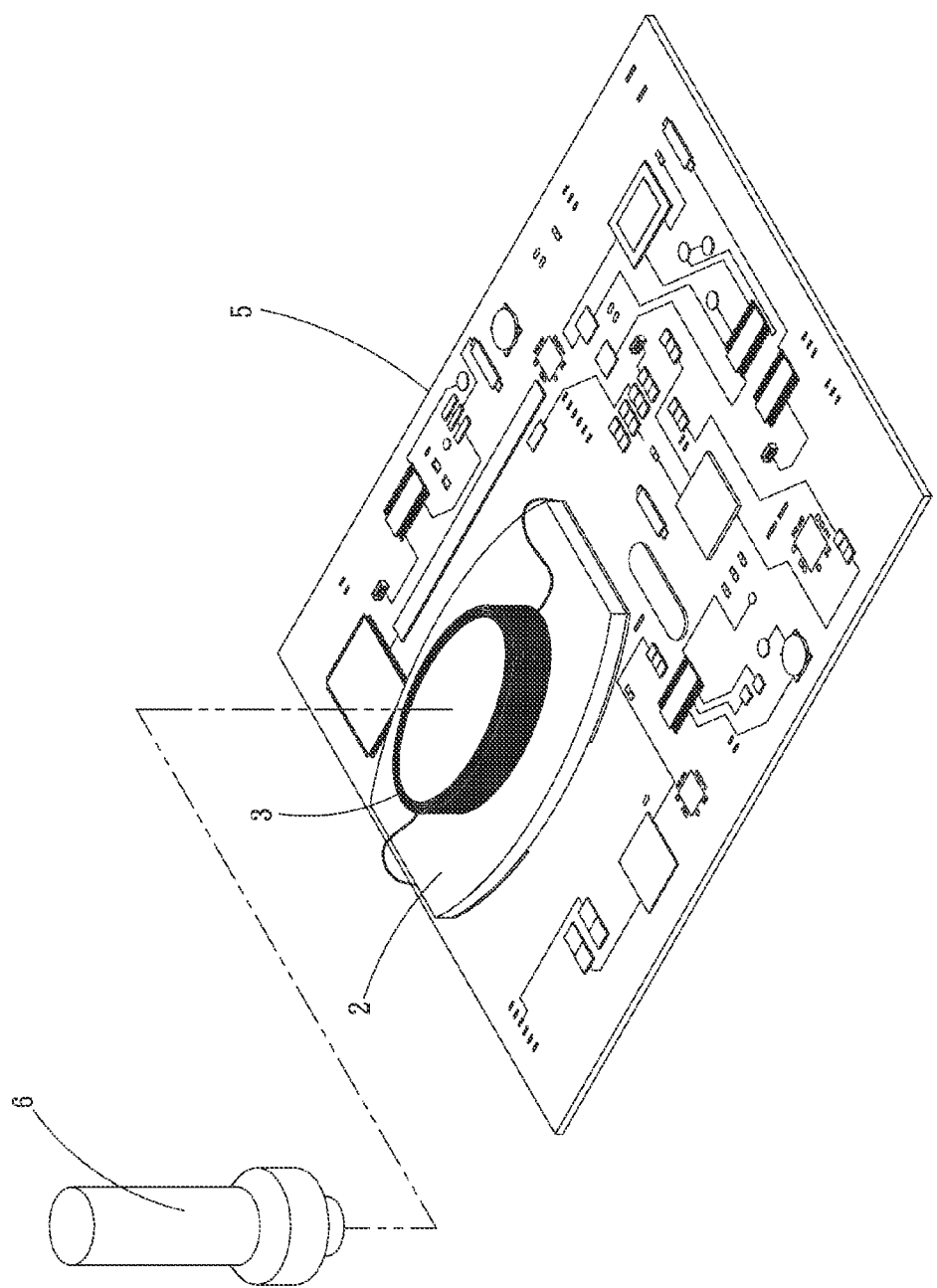
Figure 6:
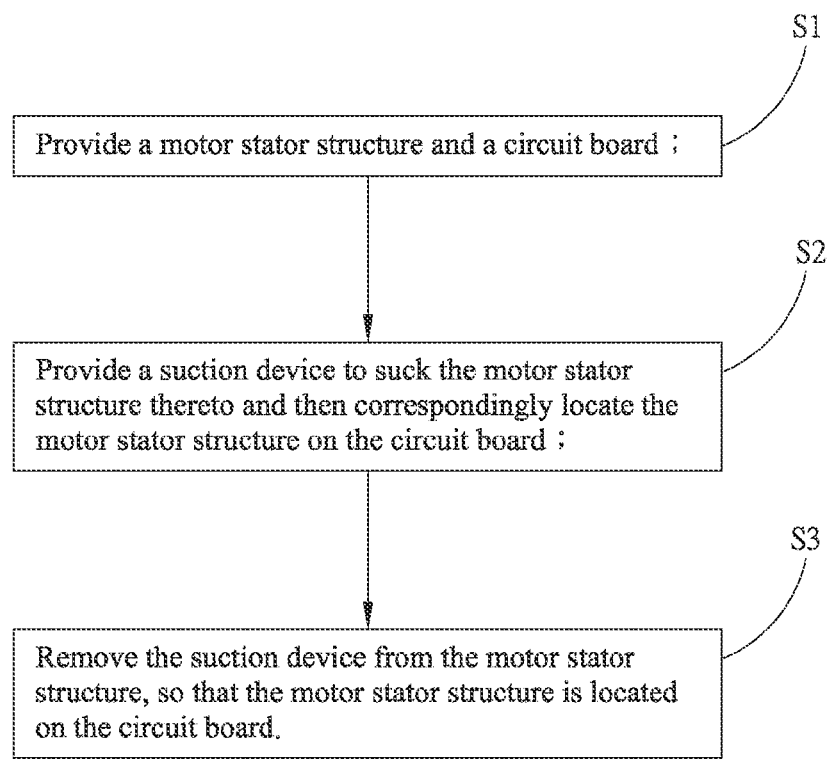
FIG. 6 is a flowchart showing the steps included in the motor stator locating method according to the preferred embodiment of the present invention.

FIGS. 4 and 5 are pictorial description of a motor stator locating method according to a preferred embodiment of the present invention, and FIG. 6 is a flowchart showing steps S1 to S3 included in the motor stator locating method. Please refer to FIGS. 4 to 6 along with FIG. 2.

In the step S1, a motor stator structure and a circuit board are provided.

More specifically, a motor stator structure 2 and a circuit board 5 are provided. The motor stator structure 2 includes a base 20 and a contact pad set 4. The base 20 is provided at a central portion thereof with a raised portion 21, and has a first and a second side 201, 202. The raised portion 21 is protruded from the first side 201 and wound around by a coil 3 having a plurality of turns, such that the coil 3 is located above the first side 201. The contact pad set 4 includes a first and a second contact pad 41, 42, each of which has an upper and a lower side 401, 402. The coil 3 has two ends, namely, a first and a second end 31, 32, which are respectively connected to the upper side 401 of the first and the second contact pad 41, 42; and the contact pad set 4 is correspondingly attached at the upper side 401 to the second side 202 of the base 20. The circuit board 5 has a plurality of electronic elements provided thereon.

In the step S2, a suction device is provided to suck the motor stator structure thereto and then correspondingly locate the motor stator structure on the circuit board.

More specifically, a suction device 6 is provided. The suction device 6 is a vacuum sucker capable of sucking the motor stator structure 2 thereto and then correspondingly locating the motor stator structure 2 on the circuit board 5.

In the step S3, the suction device is removed and the motor stator structure is located on the circuit board.

More specifically, after the motor stator structure 2 is moved onto the circuit board 5, the suction device 6 is removed and the motor stator structure 2 is located on the circuit board 5.

According to the motor stator structure 2 of the present invention, the first and the second end 31, 32 of the coil 3 are respectively connected to the first and the second contact pad 41, 42 of the contact pad set 4, and the contact pad set 4 is correspondingly attached to the second side 202 of the base 20. And, according to the motor stator locating method of the present invention, the suction device 6 firmly sucks the raised portion 21 of the base 20 to enable movement and transfer of the whole motor stator structure 2. In the preferred embodiment of the invention, the suction device 6 is a vacuum sucker, which vacuum-sucks and moves the motor stator structure 2 onto the circuit board 5 without damaging the motor stator structure 2 in the whole moving and transferring process. The motor stator structure 2 is then mounted to and located on the circuit board 5. With the special structural design of the contact pad set 4 and the locating of the motor stator structure 2 through standard operational procedures on mechanical equipment, the problem of low production efficiency of the motor stator structure 2 due to conventional manual welding process can be overcome to achieve largely increased production efficiency and reduced error rate.

In conclusion, the motor stator locating method of the present invention has the following advantages: (1) Enabling largely improved production efficiency; and (2) enabling reduced error rate in the production process.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A motor stator locating method, comprising the following steps:
   providing a motor stator structure and a circuit board;
   providing a suction device to suck the motor stator structure thereto and then correspondingly locate the motor stator structure on the circuit board;
   removing the suction device from the motor stator structure, so that the motor stator structure is located on the circuit board;
   wherein the motor stator structure includes a base and a contact pad set; the base being provided at a central portion thereof with a raised portion, and the raised portion being wound around by a coil having a plurality of turns; and the contact pad set being correspondingly attached to one side of the base, and including a first and a second contact pad, to which two ends of the coil are respectively connected.

2. The motor stator locating method as claimed in claim 1, wherein the contact pad set has an upper and a lower side; and the two ends of the coil being respectively connected to the upper side of the contact pad set.

3. The motor stator locating method as claimed in claim 2, wherein the base has a first and a second side; and the coil being located above the first side of the base, whereas the contact pad set being attached at the upper side thereof to the second side of the base.

4. The motor stator locating method as claimed in claim 1, wherein the coil has a first and a second end respectively connected to the first and the second contact pad of the contact pad set.

5. The motor stator locating method as claimed in claim 1, wherein the suction device is a vacuum suction device.

6. The motor stator locating method as claimed in claim 1, wherein the circuit board has a plurality of electronic elements provided thereon.

* * * * *